United States Patent
Mizutani

(10) Patent No.: US 7,689,840 B2
(45) Date of Patent: Mar. 30, 2010

(54) INFORMATION PROCESSING APPARATUS, IMAGING APPARATUS, AND INFORMATION PROCESSING METHOD, AND COMPUTER PROGRAM

(75) Inventor: Tomoyuki Mizutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 11/538,632

(22) Filed: Oct. 4, 2006

(65) Prior Publication Data

US 2007/0113110 A1    May 17, 2007

(30) Foreign Application Priority Data

Oct. 13, 2005  (JP)  ............... 2005-298426

(51) Int. Cl.
- G06F 1/26 (2006.01)
- G06F 1/32 (2006.01)
- H04N 5/225 (2006.01)

(52) U.S. Cl. .............. 713/300; 713/320; 713/324; 348/372

(58) Field of Classification Search .......... 713/300, 713/320, 322, 400; 348/372
See application file for complete search history.

(56) References Cited

U.S. PATENT DOCUMENTS

| | | | |
|---|---|---|---|
| 5,794,081 A * | 8/1998 | Itoh et al. ............... | 396/55 |
| 6,092,207 A | 7/2000 | Kolinski et al. | |
| 6,768,066 B2 * | 7/2004 | Wehrenberg ........... | 200/61.49 |
| 7,342,611 B2 * | 3/2008 | Larner et al. ........... | 348/372 |
| 2004/0201772 A1 * | 10/2004 | Kobayashi ............. | 348/372 |
| 2005/0128345 A1 | 6/2005 | Larner et al. | |

FOREIGN PATENT DOCUMENTS

| | | |
|---|---|---|
| JP | 10-173970 | 6/1998 |
| JP | 2000-059675 | 2/2000 |
| JP | 2000-59765 | 2/2000 |
| JP | 2003-140241 | 5/2003 |
| JP | 2003-263853 | 9/2003 |
| JP | 2003-264732 | 9/2003 |
| JP | 2003-319221 | 11/2003 |
| JP | 2005-173620 | 6/2005 |
| JP | 2005-274903 | 10/2005 |
| JP | 2005-286902 | 10/2005 |
| WO | 2004/093076 | 10/2004 |

OTHER PUBLICATIONS

International Search Report dated Mar. 23, 2007.
A Japanese Office Action dated Feb. 17, 2009 issued in connection with counterpart Japanese Patent Application No. 2005-298426.

* cited by examiner

*Primary Examiner*—Thomas Lee
*Assistant Examiner*—Zahid Choudhury
(74) *Attorney, Agent, or Firm*—Sonnenschein Nath & Rosenthal LLP

(57) ABSTRACT

An information processing apparatus, an imaging apparatus and an information processing method, and a computer program are provided. An information processing apparatus includes: a state detecting part which detects physical fluctuations that are generated in association with a user carrying the information processing apparatus; and a control part which receives detection information of the state detecting part, and which shifts a state to a hot standby state in which a system startup process necessary prior to data processing in the information processing apparatus is completed, or which executes a process to continue the hot standby state, based on determination that the information processing apparatus is being carried by the user.

15 Claims, 7 Drawing Sheets

FIG. 3

| STATE | | POWER SUPPLY | | DATA NECESSARY TO START SHOOTING | POWER CONSUMPTION | TIME NECESSARY TO START SHOOTING PROCESS |
|---|---|---|---|---|---|---|
| | | ALL DEVICES | SDRAM | | | |
| POWER ON | (a) POWER ON | PROVIDED | PROVIDED | STORED IN SDRAM | LARGE | NEARLY ZERO |
| POWER OFF | (b) HOT STANDBY | NOT PROVIDED | PROVIDED | STORED IN SDRAM | SMALL | NEARLY ZERO |
| | (c) STANDBY | NOT PROVIDED | NOT PROVIDED | NO DATA IN SDRAM | VERY SMALL | SEVERAL SECONDS |

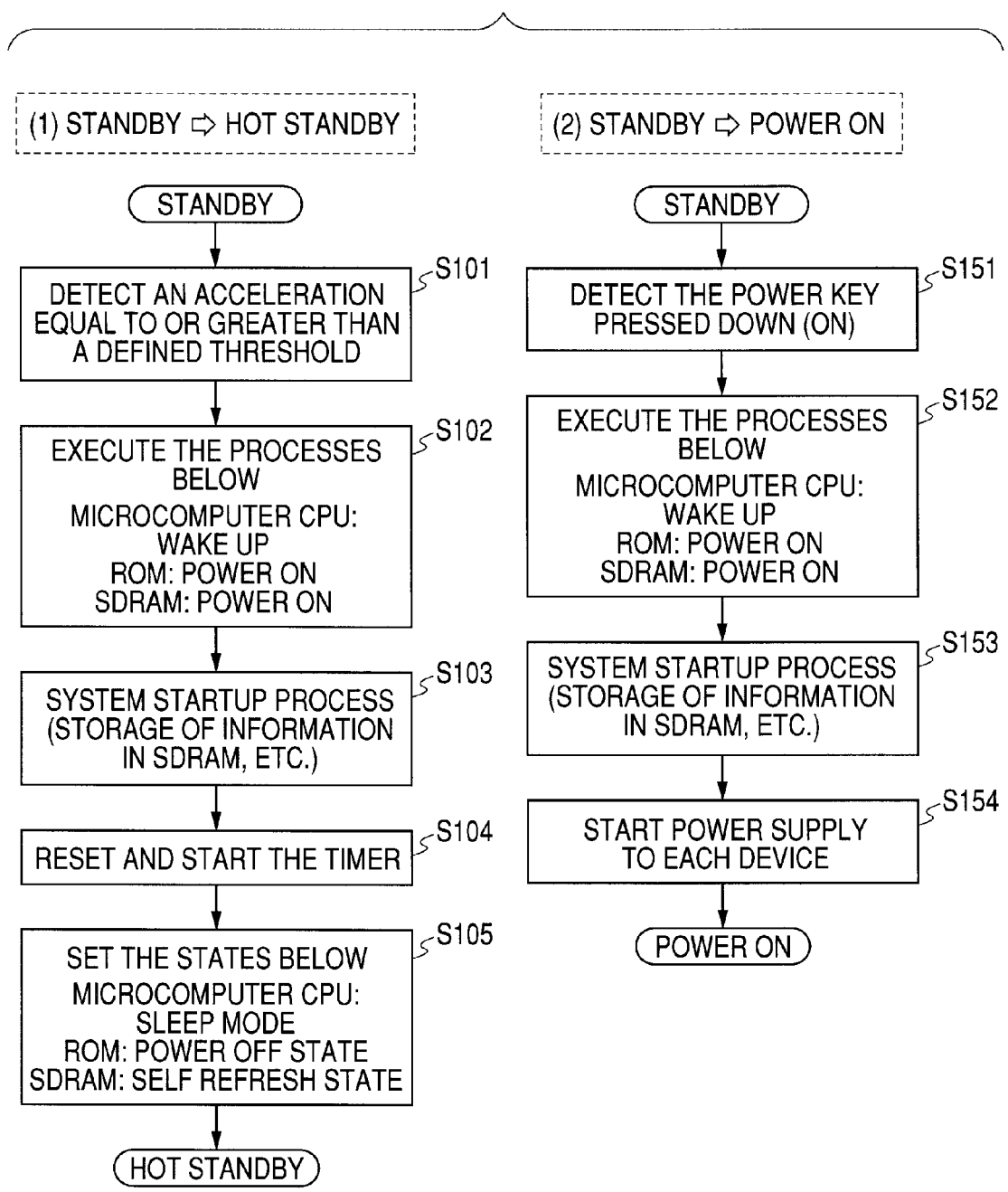

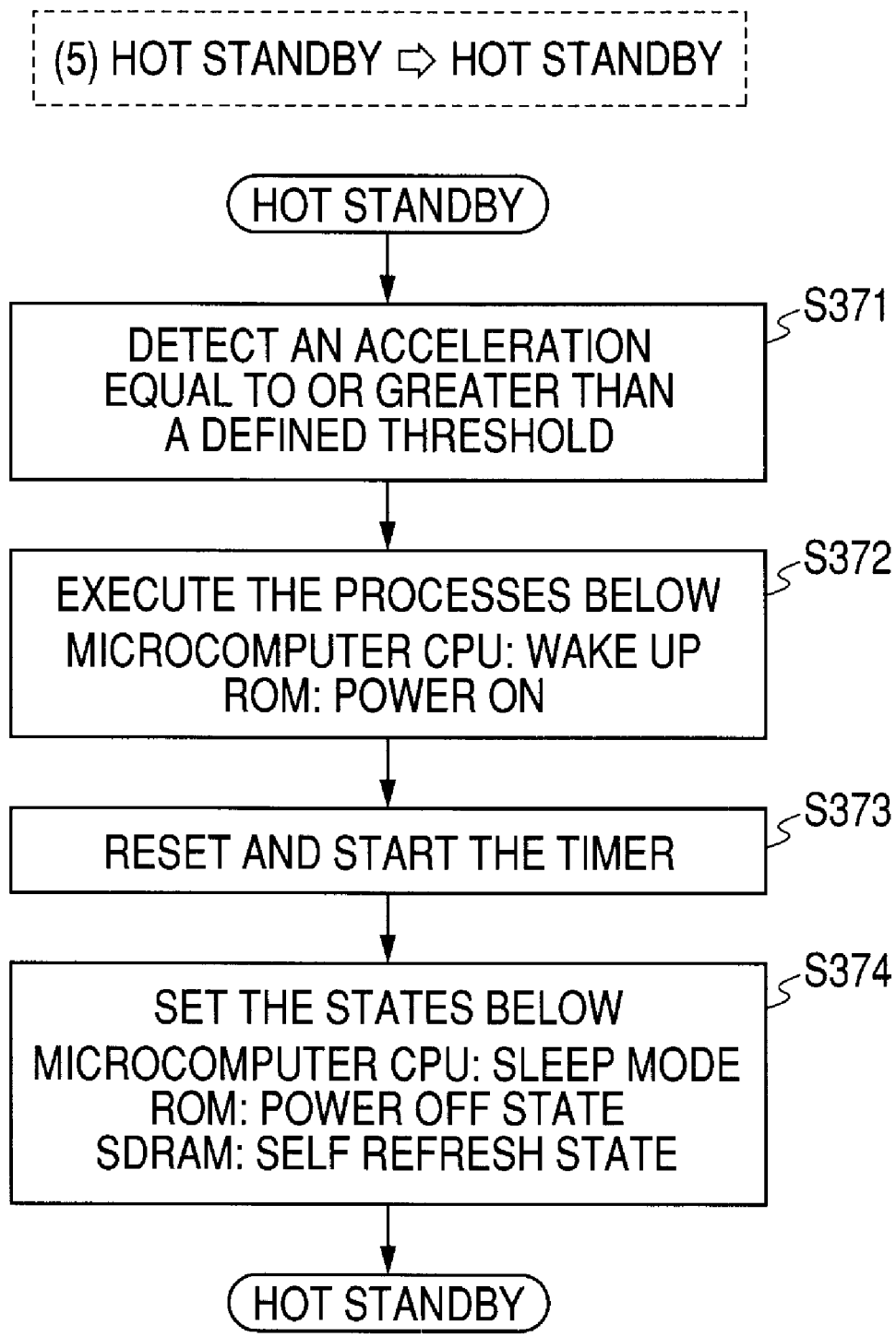

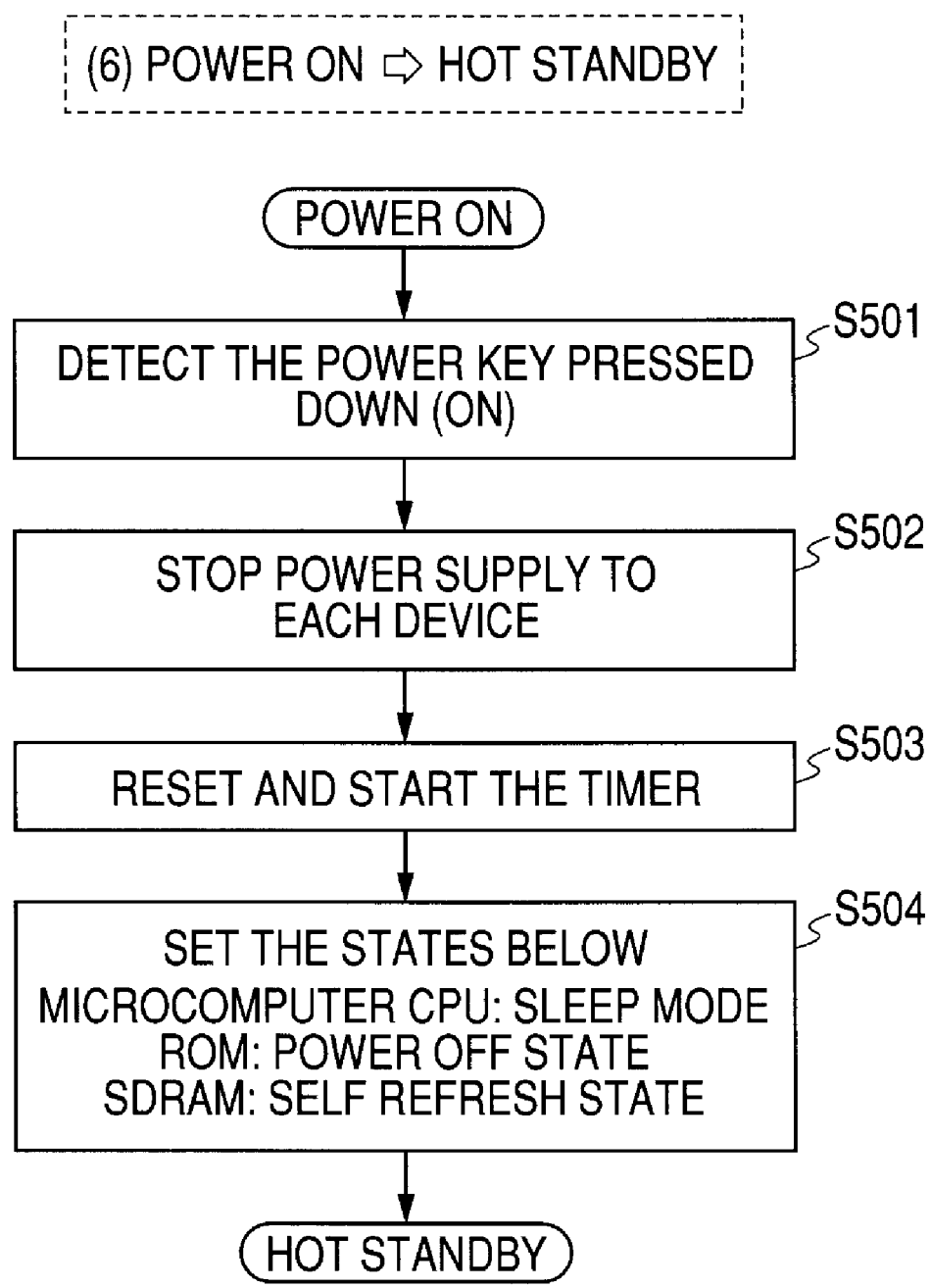

INFORMATION PROCESSING APPARATUS, IMAGING APPARATUS, AND INFORMATION PROCESSING METHOD, AND COMPUTER PROGRAM

CROSS REFERENCES TO RELATED APPLICATIONS

The present invention contains subject matter related to Japanese Patent Application JP 2005-298426 filed in the Japanese Patent Office on Oct. 13, 2005, the entire contents of which being incorporated herein by reference.

BACKGROUND OF THE INVENTION

1. Field of the Invention

The present invention relates to an information processing apparatus, an imaging apparatus, an information processing method, and a computer program. More specifically, the invention relates to an information processing apparatus, an imaging apparatus, an information processing method, and a computer program, which have the configuration that is intended to shorten a starting time as well as to reduce power consumption.

2. Description of the Related Art

In general digital cameras, a predetermined time period (a few seconds) is necessary to power a power source on from a power source off state in which a main switch is off and to establish a state to allow actual shooting. This is because a system startup process is necessary such as a process in which information necessary for an imaging process is decompressed over storing means such as an SDRAM as a volatile memory after the main switch is turned on.

Such a state is called as a hot standby state that information necessary for the imaging process is decompressed over the storing means such as an SDRAM to complete a system startup process. After the state is shifted to the hot standby state, an actual imaging process can be conducted.

A reduction in the transition time period from powering the power source to the shootable state is one of problems of the digital camera. For example, JP-A-2000-59675 (Patent Reference 1) disclose a configuration in which in a digital still camera that allows mode settings such as a recording mode and a reproduction mode, the mode is changed to a power saving mode unless otherwise a user makes a manipulation within a mode duration time defined in accordance with each mode, whereas once a mode is set, the mode is continued not to enter the power saving mode within the defined time period set in accordance with each mode, whereby the imaging process can be conducted immediately within the mode duration time.

In addition, for example, JP-A-2005-173620 (Patent Reference 2) discloses a configuration which realizes a reduction in the starting time by maintaining the hot standby state described above. More specifically, Patent Reference 2 discloses a camera configuration having a warm sleep state which continues the hot standby state that information necessary for the imaging process is decompressed over the storing means such as an SDRAM.

According to the configuration described in Patent Reference 2, even though the power source is in an off state, in the warm sleep state, power is continuously supplied to the storing means such as an SDRAM having information necessary for the imaging process stored therein. Accordingly, the hot standby state can be maintained, and shooting can be started immediately when a user intends to start shooting and turns the power source on.

However, in the configurations described in both Patent References, in order to continuously maintain a predetermined mode or the hot standby state, it is necessary to continuously supply power to the storing means (SDRAM) having information necessary for the imaging process therein. Consequently, there is a problem that power consumption becomes great. In both Patent References, the configuration is shown in which a predetermined timeout time period is provided to release a predetermined mode or the hot standby state. However, when a predetermined mode or the hot standby state is released, in the shooting operation after that, the time period from the power source on to the shootable state is the same as the time period in the camera before, causing a problem that a reduction in the starting time can not be exerted.

SUMMARY OF THE INVENTION

The invention has been made in view of the problems. It is desirable to provide an imaging apparatus, an information processing method, and a computer program, which intend a reduction in the starting time as well as implement a decrease in power consumption.

Furthermore, it is desirable to provide an information processing apparatus, an imaging apparatus, an information processing method, and a computer program, which have a configuration in which it is determined whether a user is carrying an information processing apparatus such as an imaging apparatus, when the user is carrying the apparatus, the hot standby state is continuously maintained, whereas not carrying it, the state is shifted from the hot standby state to the standby state, whereby a quick imaging process is allowed when carrying it, whereas power saving is implemented when not carrying it.

A first facet according to an embodiment of the invention is an information processing apparatus including: a state detecting part which detects physical fluctuations that are generated in association with a user carrying the information processing apparatus; and a control part which receives detection information of the state detecting part, and which shifts a state to a hot standby state in which a system startup process necessary prior to data processing in the information processing apparatus is completed, or which executes a process to continue the hot standby state, based on determination that the information processing apparatus is being carried by the user.

Furthermore, in an implementation of the information processing apparatus according to an embodiment of the invention, the control part is configured to release the hot standby state of the information processing apparatus and to execute a transition process that shifts a state to the standby state in which the system startup process completed is released, when it determines that the state in which the information processing apparatus is not carried by the user is continued for a predefined time period, based on an input condition for detection information of the state detecting part and an input of time count information from a timer.

Furthermore, in an implementation of the information processing apparatus according to an embodiment of the invention, in the hot standby state, the control part is configured to continue power supply to a storage part and to allow the storage part for self refresh, in order to maintain data recorded in the storage part which is configured of a volatile memory after a system is started up in the information processing apparatus.

Furthermore, in an implementation of the information processing apparatus according to an embodiment of the invention, the state detecting part is an acceleration sensor, and the control part is configured to determine whether the information processing apparatus is being carried by the user, based on input information from the acceleration sensor.

Furthermore, in an implementation of the information processing apparatus according to an embodiment, the acceleration sensor is an acceleration sensor which detects a drop of the information processing apparatus in order to prevent a hard disk provided in the information processing apparatus from being damaged.

Furthermore, in an implementation of the information processing apparatus according to an embodiment of the invention, the state detecting part is a touch sensor, a temperature sensor, or pressure sensor; and the control part is configured to determine whether the information processing apparatus is being carried by the user, based on input information from the touch sensor, the temperature sensor, or pressure sensor.

Furthermore, a second facet according to an embodiment of the invention is an imaging apparatus including: an imaging device which executes imaging processing; a state detecting part which detects physical fluctuations that are generated in association with a user carrying the imaging apparatus; and a control part which receives detection information of the state detecting part, and which shifts a state to a hot standby state in which a system startup process necessary prior to data processing in the imaging apparatus is completed, or which executes a process to continue the hot standby state, based on determination that the imaging apparatus is being carried by the user.

Furthermore, in an implementation of the imaging apparatus according to an embodiment of the invention, the state detecting part is an acceleration sensor; and the control part is configured to determine whether the imaging apparatus is being carried by the user, based on input information from the acceleration sensor.

Furthermore, in an implementation of the imaging apparatus according to an embodiment of the invention, the acceleration sensor is a gyro which is a camera shake detecting device provided in the imaging apparatus.

Furthermore, a third facet according to an embodiment of the invention is an information processing method including the steps of: detecting physical fluctuations that are generated in association with a user carrying an information processing apparatus; and controlling for receiving detection information at the state detecting step, and shifting a state to a hot standby state in which a system startup process necessary prior to data processing in the information processing apparatus is completed, or executing a process to continue the hot standby state, based on determination that the information processing apparatus is being carried by the user.

Furthermore, in an implementation of the information processing method according to an embodiment of the invention, the information processing method further including the step of: releasing the hot standby state of the information processing apparatus and executing a transition process that shifts a state to the standby state in which the system startup process completed is released, when it is determined that the state in which the information processing apparatus is not carried by the user is continued for a predefined time period, based on an input condition for detection information at the state detecting step and an input of time count information from a timer.

Furthermore, in an implementation of the information processing method according to an embodiment of the invention, the information processing method further including the step of: in the hot standby state, continuing power supply to a storage part and allowing the storage part for self refresh, in order to maintain data recorded in the storage part which is configured of a volatile memory after a system is started up in the information processing apparatus.

Furthermore, in an implementation of the information processing method according to an embodiment of the invention, the state detecting step is the step of detecting an acceleration by an acceleration sensor; and the controlling step is to determine whether the information processing apparatus is being carried by the user, based on input information from the acceleration sensor.

Furthermore, in an implementation of the information processing method according to an embodiment of the invention, the state detecting step is the step of detecting a state by a touch sensor, a temperature sensor, or pressure sensor; and the controlling step is to determine whether the information processing apparatus is being carried by the user, based on input information from the touch sensor, or the temperature sensor, or pressure sensor.

Furthermore, a fourth facet of an embodiment of the invention is a computer program which allows an information processing apparatus to control a state, the computer program including the steps of: detecting physical fluctuations that are generated in association with a user carrying an information processing apparatus; and controlling for receiving detection information at the state detecting step, and shifting a state to a hot standby state in which a system startup process necessary prior to data processing in the information processing apparatus is completed, or executing a process to continue the hot standby state, based on determination that the information processing apparatus is being carried by the user.

In addition, the computer program according to an embodiment of the invention is a computer program that can be offered by a storage medium or a communicating medium that offers various program codes to a general purpose computer system in a computer readable form, the media including CD, FD, and MO, or, a network. The program like this is offered in the computer readable form, whereby process steps in accordance with the program can be implemented on the computer system.

Other features and advantages according to an embodiment of the invention will be apparent from the detailed description based on implementations according to an embodiment of the invention with reference to the accompanying drawings. In addition, in the specification, the system represents a logical assembly configured of a plurality of devices, which is not limited to that having devices with individual configurations in the same cabinet.

According to the configuration of an embodiment of the invention, for example, it is configured in the information processing apparatus such as a digital camera in which two states are provided when the power source is turned off: the standby state that places priority to power saving, and the hot standby state that places priority to the starting time, and it is determined whether the apparatus is being carried by a user to execute the transition between these two states. Therefore, a reduction in the starting time and power saving of a battery can be compatible.

For example, when a user is carrying the information processing apparatus (camera), physical fluctuations generated in the apparatus such as an acceleration greater than a defined value is detected to set the state to the hot standby state that places priority to the starting time to allow immediate shooting, whereby the shutter chance can be get immediately almost all the time. On the other hand, when a user does not carry the camera, based on the timeout time period measured by the timer, the state is set to the standby state that places priority to power saving. With this configuration, power consumption can be suppressed, and the battery duration time can be extended as long as possible.

BRIEF DESCRIPTION OF THE DRAWINGS

FIG. 3 shows a diagram illustrative of the detail of the states that can be set by the information processing apparatus according to an embodiment of the invention;

FIG. 4 shows a diagram depicting flowcharts illustrative of the process steps done when the state is shifted from a standby state to the hot standby state and to a power on state in the information processing apparatus according to an embodiment of the invention;

FIG. 6 shows a diagram depicting a flow chart illustrative of the process steps done in continuing the hot standby state in the information processing apparatus according to an embodiment of the invention; and FIG. 7 shows a diagram depicting a flow chart illustrative of the process steps done in shifting the state from the power on state to the hot standby state in the information processing apparatus according to an embodiment of the invention.

DETAILED DESCRIPTION OF THE INVENTION

Hereinafter, the detail of an information processing apparatus, an imaging apparatus, an information processing method, and a computer program according to an embodiment of the invention will be described with reference to the drawings.

Figure 1:
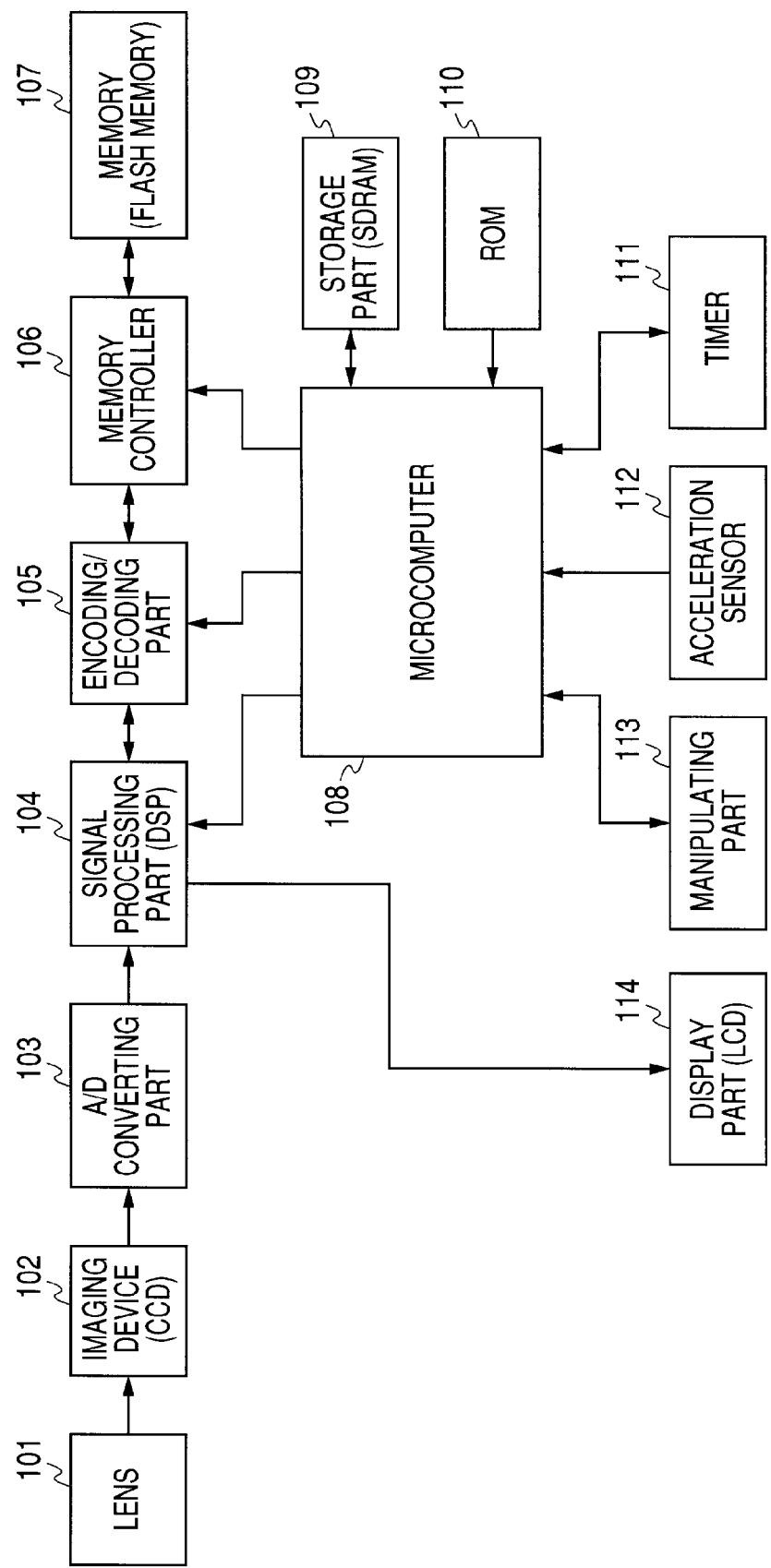
FIG. 1 shows a block diagram depicting the configuration of an information processing apparatus according to an embodiment of the invention.

First, an exemplary configuration of the information processing apparatus will be described with reference to FIG. 1. FIG. 1 shows a block diagram depicting the configuration of an imaging apparatus (digital camera) as an implementation of the information processing apparatus.

As shown in FIG. 1, the imaging apparatus has a lens 101, a solid state imaging device (CCD) 102 which converts a light signal inputted through the lens 101 into an electric signal, an A/D converting part 103 which quantizes an analog electric signal and converts it into a digital signal, a signal processing part (DSP) 104 which conducts signal processing with respect to a reproduced image based on data acquired from a taken image and a memory, an encoding/decoding part 105 which encodes and decodes image data, a memory controller 106 which controls image data to be stored in a memory 107 and controls data to be read out of a memory 107, the memory 107 such as a flash memory which stores data including an taken image, a microcomputer 108 which functions as a control part that controls data processing such as an imaging process, a storage part 109 as a volatile memory device which stores information necessary for executing a program of the microcomputer 108, and a ROM 110 which stores a program that is a process algorithm executed by the microcomputer. In addition, the storage part 109 is configured of an SDRAM, for example.

Furthermore, the information processing apparatus has an acceleration sensor 112 which detects states of the apparatus, for example, whether a user is carrying the apparatus, the apparatus is stationary, and so on, a timer 111 which counts a predetermined time period, a manipulating part 113 which is operable by a user including a power source key and a shutter on a camera main body, and a display part 114 which is configured of an LCD and other devices and displays image data.

The acceleration sensor 112 functions as a state detecting part which detects physical fluctuations generated in association with a user carrying the information processing apparatus (imaging apparatus). The acceleration sensor 112 is configured of a three axis acceleration sensor, for example, which detects accelerations corresponding to three orthogonal axes, the X-axis, the Y-axis, and the Z-axis, for inputting detected data to the microcomputer 108 as an apparatus control part. The microcomputer 108 as the apparatus control part conducts a state determination process which determines the state of the imaging apparatus 100, that is, which determines whether the apparatus is stationary or whether a user is carrying the apparatus, for example, based on acceleration information inputted from the acceleration sensor 112, and conducts process control based on determination information.

To the microcomputer 108, in addition to an acceleration detection signal from the acceleration sensor 112, such signals are inputted as interrupt signals including a detection signal that detects a press of the power source key from the manipulating part 113 and a timeout detection signal from the timer 111. When these interrupt signals are inputted, even in a sleep state that is the power saving state of the CPU, the microcomputer 108 conducts a transition process from the sleep state to the active state that is the operation mode, that is, it wakes up the apparatus.

In the imaging apparatus shown in FIG. 1, a process done in the power on state will be described. A subject image passes through an optical system configured of the lens 101 and the other devices, and reaches the solid state imaging device (CCD) 102. When the incident light based on the subject image reaches each of the light receiving devices of the CCD, it is converted into an electric signal by photoelectric conversion at the light receiving devices, and is inputted to the A/D converting part 103. The A/D converting part 103 quantizes the inputted electric signal, and converts it into a digital signal. The digital signal is inputted to the signal processing part (DSP) 104 for signal processing. In the digital signal processing part 104, the inputted image data is processed by various parameters, and the processed image is processed into video signals for display on the display part 114 such as a LCD.

When the signal signaling that the shutter key included in the manipulating part 113 has been pressed is inputted to the microcomputer 108, under control by the microcomputer 108, the signal processing part (DSP) 104 enters image data to the encoding/decoding part 105. In the encoding/decoding part 105, the image data is encoded, and the encoded data is recorded in the memory 107 such as a flash memory under control by the memory controller 106.

On the other hand, when a reproduction process is conducted in which the image data recorded in the memory 107 is displayed on the display part 114 such as an LCD, under control by the memory controller 106, the encoded data is read out of the memory 107 such as a flash memory, and it is outputted to the encoding/decoding part 105. It is decoded in the encoding/decoding part 105, and the decoded image data is processed into the video signals, and displayed on the display part 114 such as an LCD. The control for the process steps described above is done by the microcomputer 108.

The microcomputer 108 applies information necessary to conduct the program stored in the ROM 110 and the program stored in the storage part 109 such as an SDRAM for the imaging process and for process control for the other processes. In addition, the storage part 109 configured of an SDRAM and the other devices are used as the storage part which stores information necessary for the imaging process, and is configured of a volatile memory device. When the imaging process is conducted, such a state is necessary that various items of information are stored in the storage part 109.

Figure 2:
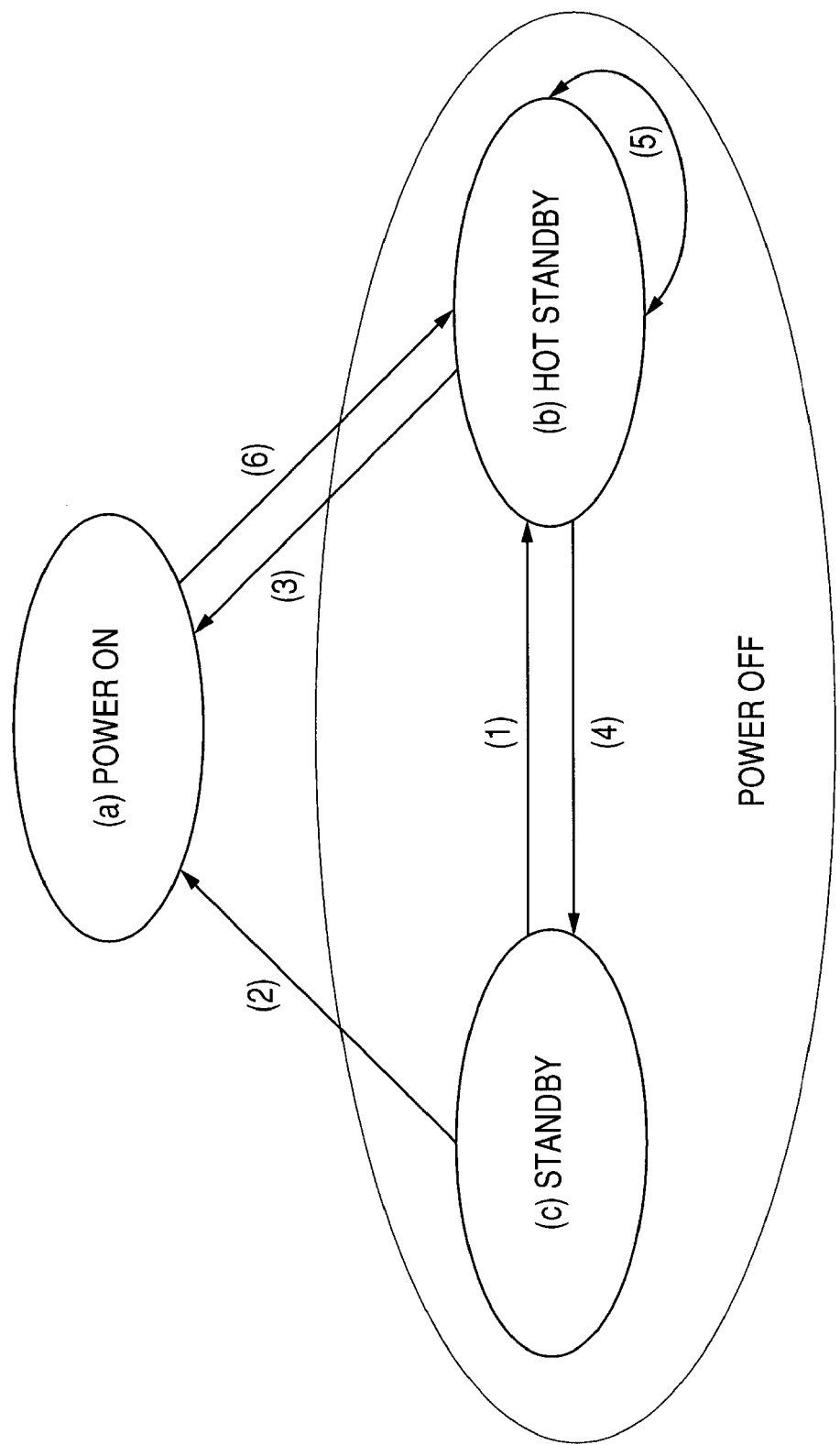
FIG. 2 shows a diagram illustrative of the state transition of the information processing apparatus according to an embodiment of the invention.

The state transition of the imaging apparatus will be described with reference to FIG. 2. As shown in FIG. 2, the imaging apparatus has three states below, and the state is changed among these three states.

(a) Power on state.
(b) Hot standby state.
(c) Standby state.

The following is the types of the state transition.

State transition (1): (c) standby state to (b) hot standby state
State transition (2): (c) standby state to (a) power on state
State transition (3): (b) hot standby state to (a) power on state
State transition (4): (b) hot standby state to (c) standby state
State transition (5): (b) hot standby state to (b) hot standby state
State transition (6): (a) power on state to (b) hot standby state The state transitions are conducted under predetermined conditions. The specific sequences of the individual state transitions will be described with reference to flow charts below.

The power on state is the state in which the imaging process described above is being executed or is operable, and in which electric power is supplied to all the devices used in the imaging process. In this state, the system startup process is already completed, information necessary to conduct the imaging process is stored in the storage part 109 such as an SDRAM, power is being supplied to the storage part, and information is maintained.

In addition, power is supplied to all the microcomputer 108, the timer 111, the acceleration sensor 112, and the manipulation key 113 even in any states of the power on state, the hot standby state, and the standby state. When an interrupt signal is inputted from the timer 111, the acceleration sensor 112, and the manipulation key 113, the microcomputer 108 conducts the wakeup process as the transition process from the sleep state to the active state as the operation mode even though the state is in the sleep state that is the power saving state of the CPU.

The hot standby state and the standby state are the different states in the power source off state. In the power source off state, the power supply is basically stopped to all the devices used in the imaging process.

The hot standby state is the state which maintains the startup process for the system being completed. In addition to the microcomputer 108, the timer 111, the acceleration sensor 112, and the manipulation key 113, power is supplied to the storage part 109 such as an SDRAM in which information necessary to conduct the imaging process is stored, and it is the state in which information stored in the SDRAM is held. Although the hot standby state is not the state to conduct the imaging process, it is the state that maintains the state in which the startup process for the system is completed, and that can be shifted to start shooting immediately.

The standby state is the state that has not yet run the startup process for the system in which power is supplied to the microcomputer 108, the timer 111, the acceleration sensor 112, and the manipulation key 113 but power supply is stopped to the other devices and the storage part 109 such as an SDRAM. When the state is shifted from the standby state to the power on state to start shooting, it is necessary to newly execute the system startup process including the process for decompressing information necessary to shoot over the storage part 109 such as an SDRAM and other processes. The startup process takes a predetermined time period (a few seconds).

Specific forms of the following states will be described with reference to FIG. 3.

(a) Power on state.
(b) Hot standby state.
(c) Standby state.

(a) Power on State

The power on state is the state in which power is supplied to all the devices necessary for the imaging process including the SDRAM and the storage part (SDRAM) 109 is in the state in which it holds information necessary for the imaging process. The power consumption in this state is the greatest among the other states. In addition, in this state, the time period necessary to start shooting is nearly zero, and the imaging process can be run immediately.

(b) Hot Standby State

The hot standby state is the state which maintains the state in which the startup process for the system is completed. Power is supplied to the storage part (SDRAM) 109, but power supply is basically stopped to all the devices necessary for the imaging process. The storage part (SDRAM) 109 is in the state in which it holds information necessary for the imaging process. The power consumption in this state is very smaller than that in the power on state, but it is greater than that in the standby state. In addition, in this state, the state is in the state which maintains the startup process for the system being completed. Thus, the time period necessary to start shooting is nearly zero, and the imaging process can be executed immediately.

(c) Standby State

The standby state is the state in which current is carried only through the microcomputer 108, the timer 111, the acceleration sensor 112, and the manipulation key 113, and the power supply is stopped to all the devices including the SDRAM necessary for the imaging process. The state is the state in which the startup process for the system has not been run yet and the storage part (SDRAM) 109 does not hold information necessary for the imaging process. The power consumption in this state is very small. In this state, it is necessary to conduct the startup process to start shooting, taking a few seconds to start shooting.

Next, the state transitions done in the imaging apparatus as the information processing apparatus will be describes with reference to flow charts shown in FIG. 4 and the other drawings. More specifically, the detailed process sequence of six types of state transitions will be described.

State transition (1): (c) standby state to (b) hot standby state
State transition (2): (c) standby state to (a) power on state
State transition (3): (b) hot standby state to (a) power on state
State transition (4): (b) hot standby state to (c) standby state
State transition (5) (b) hot standby state to (b) hot standby state
State transition (6) (a) power on state to (b) hot standby state First, the state transition sequences of the following states will be described with reference to FIG. 4.

State transition (1): (c) standby state to (b) hot standby state
State transition (2): (c) standby state to (a) power on state State Transition (1): (c) Stand by State to (b) Hot Stand by State The state transition is executed when the value detected by the acceleration sensor 112 shown in FIG. 1 is greater than a predetermined threshold in the standby state. More specifically, based on the detected acceleration information inputted from the acceleration sensor 112 to the microcomputer 108, the microcomputer 108 determines that it is the state in which the apparatus is being carried by a user on the basis of the detection of an acceleration greater than a defined threshold. When this determination is made, the transition process is executed from the standby state to the hot standby state.

More specifically, in the case in which the imaging apparatus which is placed on a desk, for example, and is stationary is carried by a user, an acceleration greater than the threshold is detected to execute the transition process from the standby state to the hot standby state.

The process steps done by the microcomputer 108 in the state transition from the standby state to the hot standby state will be described with reference to State transition (1) in FIG. 4. In the standby state, current is carried only through the microcomputer 108, the acceleration sensor 112, and the manipulation key 113. However, the CPU of the microcomputer 108 is in the sleep state.

First, at Step S101, when an acceleration greater than a defined value is detected in the acceleration sensor 112, an interrupt signal is inputted to the microcomputer 108. The microcomputer 108 uses input of the interrupt signal from the acceleration sensor as a trigger to execute the process steps after at Step S102.

At Step S102, the wakeup process is conducted which shifts the state of the CPU in the microcomputer 108 from the sleep state to the active state, and the power sources of the ROM 110 and the storage part (SDRAM) 109 are set to on.

After that, at Step S103, the system startup process is executed, the process including initializing the microcomputer 108 and the storage part (SDRAM) 109 and starting up an OS. In the system startup process, a process step is conducted in which information necessary to conduct the imaging process is decompressed and stored in the storage part (SDRAM) 109. For the system startup process, it generally takes about a few seconds to complete the process.

Furthermore, after the system startup process is finished, at Step S104, a process step is executed in which the timer 111 is reset and started. The process step is the process which starts to measure the duration time for hot standby at the timer 111. The process which applies the measuring time period in the timer 111 will be described later.

Subsequently, at Step S105, the following states are established.

The CPU of the microcomputer 108 is set to the sleep mode.

Power supply is stopped to the ROM 110.

Carrying current is maintained for the storage part (SDRAM) 109, and is allowed for self refresh.

With these process steps, the imaging apparatus is set in the state which maintains the startup process for the system being completed, that is, it is set in a so-called hot standby state.

In addition, the self refresh state of the storage part (SDRAM) 109 is the process state in which the SDRAM is refreshed independently to maintain data stored in the SDRAM with no external command input by the microcomputer, for example. The SDRAM is periodically refreshed by itself by applying a timer or a counter inside the SDRAM. Self refresh can be conducted with the use of a slight amount of electric power supplied to the storage part (SDRAM) 109. The self refresh process holds information necessary to conduct the imaging process stored in the storage part (SDRAM) 109.

Next, the process steps done by the microcomputer 108 in the state transition from the standby state to the power on state will be described with reference to State transition (2) in FIG. 4. The state transition occurs by manipulating (turning on) the power source key by a user. In the standby state, as described above, current is carried only through the microcomputer 108, the acceleration sensor 112, and the manipulation key 113. However, the CPU of the microcomputer 108 is in the sleep state.

At Step S151, when it is detected that the power source key of the manipulating part 113 is pressed down and a signal (ON signal) signaling that the power source key has been pressed down is inputted to the microcomputer 108, at Step S152, the wakeup process is conducted which shifts the state of the CPU in the microcomputer 108 from the sleep state to the active state, and the power sources of the ROM 110 and the storage part (SDRAM) 109 are set to on.

After that, at Step S153, the system startup process is conducted including initializing the microcomputer 108 and the storage part (SDRAM) 109 and starting up the OS. In the system startup process, a process step is conducted in which information necessary to conduct the imaging process is decompressed and recorded in the storage part (SDRAM) 109. For the startup process, it takes about a few seconds to complete the process.

Furthermore, after the startup process is finished, at Step S154, power supply is started to each device necessary to operate in the imaging process. With these process steps, the apparatus is set in the power on state in which an image can be shot as a camera.

In two processes shown in FIG. 4, that is, in the state transitions below, it is necessary to conduct the system startup process in both state transitions, the system startup process including starting up the OS, initializing the storage part (SDRAM) 109, storing information, etc. A few seconds of a processing time period is necessary to do the state transition to start shooting.

State transition (1): (c) standby state to (b) hot standby state
State transition (2): (c) standby state to (a) power on state Next, the state transition sequences will be described with reference to FIG. 5.

State transition (3): (b) hot standby state to (a) power on state
State transition (4): (b) hot standby state to (c) standby state First, the transition process, State transition (3): (b) hot standby state to (a) power on state, will be described. The state transition occurs by manipulating (turning on) the power source key by a user. In the hot standby state, current is carried through the microcomputer 108, the storage part (SDRAM) 109, the timer 111, the acceleration sensor 112, and the manipulation key 113, and the CPU of the microcomputer 108 is in a steady sleep state.

In the hot standby state, it is the state which maintains the startup process for the system being completed and in which power is supplied to the storage part (SDRAM) 109 and the storage part (SDRAM) 109 holds information necessary for shooting.

First, at Step S301, when it is detected that the power source key of the manipulating part 113 is pressed down and a signal (ON signal) signaling that the power source key is pressed down is inputted to the microcomputer 108, at Step S302, the wakeup process is conducted which shifts the state of the CPU in the microcomputer 108 from the sleep state to the active state, and the power source of the ROM 110 is turned on.

Subsequently, at Step S303, power supply is started to each device necessary to operate in the imaging process. With these process steps, the apparatus is set to the power on state in which an image can be shot as a camera.

As described above, in the transition process from the hot standby state to the power on state, the system startup process is unnecessary, and the time period necessary for the state transition is a very short time period. Accordingly, when the apparatus is in the hot standby state, it can start shooting immediately.

Next, the process sequence in the state transition process, State transition (4): (b) hot standby state to (c) standby state, will be described. The state transition is executed when the duration time for the hot standby state measured at the timer 111 reaches a predefined time. The timer 111 is reset at the time when the state is shifted to the hot standby state, and measures the duration time for the hot standby state.

When the duration time for the hot standby state reaches the predefined time, that is, when the measuring time period for the timer 111 reaches the predefined time, an interrupt signal is inputted to the microcomputer 108. The process step at Step S351 is a timeout detection process based on the interrupt signal.

When a timeout is detected, at Step S352, the wakeup process is conducted which shifts the state of the CPU in the microcomputer 108 from the sleep state to the active state, and the power source of the ROM 110 is turned on.

Subsequently, at Step S353, the following states are set.

The CPU of the microcomputer 108 is set to the sleep mode.

Power supply is stopped to the ROM 110.

Power supply is stopped to the storage part (SDRAM) 109.

With these process steps, transition to the standby state is completed. In addition, power supply is stopped to the storage part (SDRAM) 109 at Step S353 to delete setting information necessary for the imaging process stored in the storage part (SDRAM) 109. More specifically, after transition to the standby state, it is necessary to do the system startup process again in order to start shooting.

The transition process from the hot standby state to the standby state is executed when the duration time for the hot standby state measured at the timer 111 reaches the predefined time. However, in the information processing apparatus (imaging apparatus), the hot standby state is configured to continue exceeding the defined time based on a certain condition.

More specifically, when such a state is continued that the apparatus is being carried by a user, the hot standby state is continued. It is determined whether the apparatus is being carried by the user based on input information of the acceleration sensor 112. The process to continue the hot standby state, that is, the process done by the microcomputer 108 in the state transition, State transition (5): (b) hot standby state to (b) hot standby state, shown in FIG. 2 will be described with reference to a flow chart shown in FIG. 6.

In the hot standby state, current is carried through the microcomputer 108, the storage part (SDRAM) 109, the timer 111, the acceleration sensor 112, and the manipulation key 113, and the CPU of the microcomputer 108 is in the steady sleep state. The hot standby state is the state which maintains the startup process for the system being completed and in which power is supplied to the storage part (SDRAM) 109 and the storage part (SDRAM) 109 holds information necessary for the imaging process.

First, at Step S371, when an acceleration greater than a predefined value is detected at the acceleration sensor 112, an interrupt signal is inputted to the microcomputer 108.

At Step S372, the wakeup process is conducted which shifts the state of the CPU in the microcomputer 108 from the sleep state to the active state, and the power source of the ROM 110 is turned on.

Furthermore, at Step S373, a process step is conducted which resets and starts the timer 111. In addition, when the process steps shown in this flow are conducted, the state is already in the hot standby state as well as the timer 111 is measuring the duration time for hot standby, but at Step S373, the timer 111 is reset. More specifically, measuring the duration time for hot standby is stopped before timeout, and measuring the duration time for hot standby is again started from zero.

After that, at Step S374, the following states are set.

The CPU of the microcomputer 108 is set to the sleep mode.

Power supply is stopped to the ROM 110.

Current is continuously supplied to the storage part (SDRAM) 109, and is allowed for self refresh.

With these process steps, the imaging apparatus is continuously maintained in the hot standby state. In the hot standby state, the state is maintained that the startup process for the system is completed, and shooting can be started immediately.

As described above, according to the configuration of an embodiment of the invention, for example, in such a state that a user is carrying the apparatus and an acceleration greater than a predetermined threshold is detected, the hot standby state is continued regardless of a preset timeout time period, and a reduction in a time period to start shooting is implemented all the time.

Figure 5:
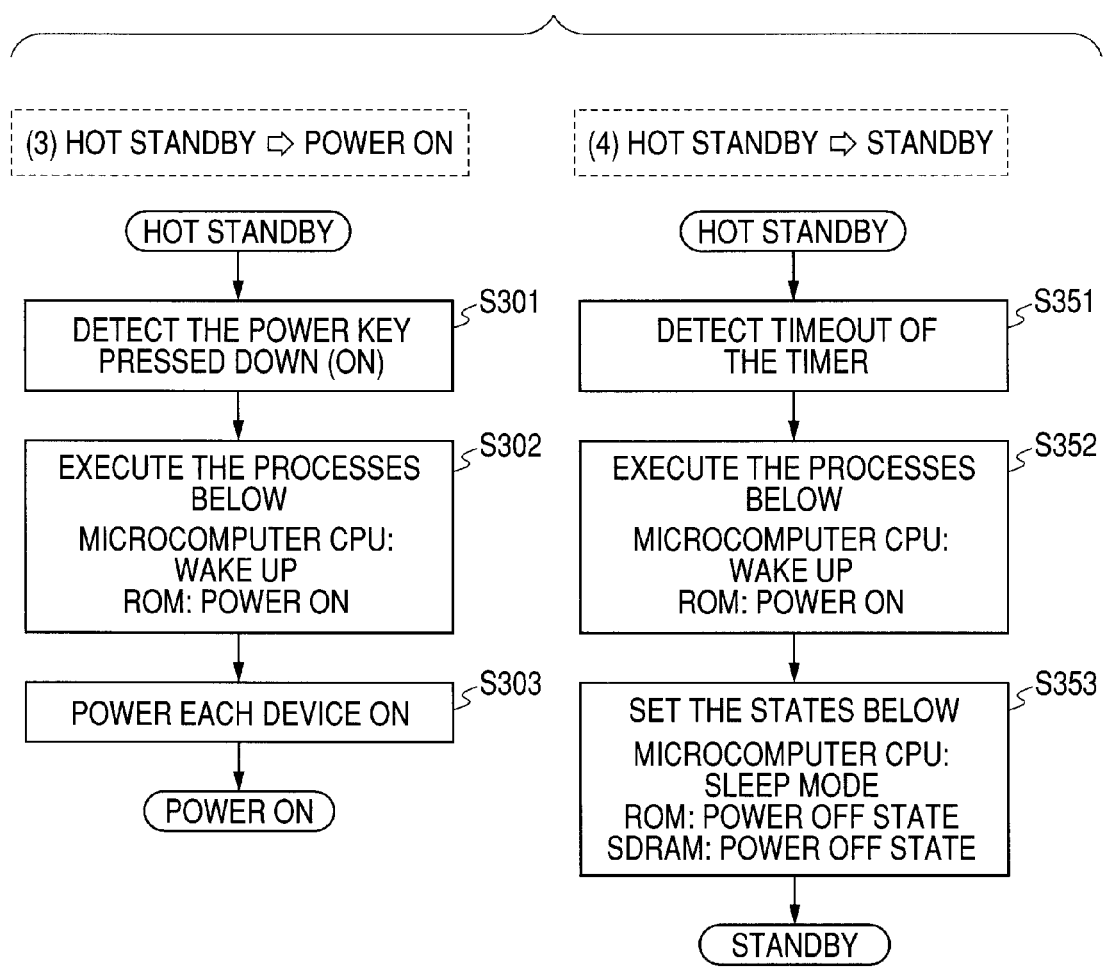
FIG. 5 shows a diagram depicting flowcharts illustrative of the process steps done when the state is shifted from the hot standby state to the power on state and to the hot standby state in the information processing apparatus according to an embodiment of the invention.

On the other hand, when the user stop carrying the apparatus and places it on a desk, for example, to leave it, the acceleration sensor 112 does not detect an acceleration greater than a defined value. Thus, the process from the hot standby state to the hot standby state shown in FIG. 6 is not executed, and the process based on timeout by the timer 111, that is, the process from the hot standby state to the standby state shown in State transition (2) in FIG. 5 is executed. The transition process to the standby state stops power supply to the SDRAM, and thus unnecessary power consumption is reduced in the state in which a user does not use the apparatus.

Next, the process done by the microcomputer 108 in the state transition, State transition (6): (a) power on state to (b) hot standby state, will be described with reference to FIG. 7. The state transition occurs by manipulating (turning off) the power source key by a user. The power on state is the state which allows shooting in which the power is supplied to each device.

At Step S501, when it is detected that the power source key of the manipulating part 113 is pressed down and a signal (OFF signal) signaling that the power source key has been pressed is inputted to the microcomputer 108, power supply is stopped to each device at Step S502. In addition, also in this state, power is continuously supplied to the microcomputer 108, the timer 111, the acceleration sensor 112, and the manipulation key 113 as well as the storage part 109 such as an SDRAM in which information necessary to conduct the imaging process is stored.

Subsequently, at Step S503, a process step is conducted which resets and starts the timer 111. This process step is the process that starts measuring the duration time for hot standby at the timer 111.

Subsequently, at Step S504, the following states are set.

The CPU of the microcomputer 108 is set to the sleep mode.

Power supply is stopped to the ROM 110.

Current is kept supplied to the storage part (SDRAM) 109, and is allowed for self refresh.

With these process steps, the imaging apparatus is set in the state which maintains the startup process for the system being completed, being set in a so-called hot standby state.

As described above, in the information processing apparatus, it is configured in which the acceleration sensor detects acceleration information to determine whether the apparatus is highly likely to be used. When the acceleration sensor detects an acceleration greater than a defined value, it is determined that a user is carrying the apparatus and the apparatus is highly likely to be used. In this case, the hot standby state is continued which immediately allows shooting, and a process is conducted which shifts the state from the hot standby state to the standby state only when the acceleration sensor does not detect an acceleration greater than a defined value for a predefined time period. Therefore, when the user is carrying the apparatus, the state is set in the hot standby state to immediately allow the imaging process, whereas when the user does not carry the apparatus, the state is set to the standby state to suppress power consumption, whereby an ideal configuration can be implemented.

In addition, in the embodiment, an example is explained that the acceleration sensor is used for detecting the acceleration of the apparatus as means to detect whether the imaging apparatus is being carried by user. However, the same process steps can be implemented in this configuration, for example, in which a touch sensor is provided in the apparatus to detect a touch by a user and detection information of the touch sensor is inputted to the microcomputer. Alternatively, this configuration may be done in which a pressure sensor is provided in the apparatus to detect a grip of a user and detection information of the pressure sensor is inputted to the microcomputer, or this configuration may be done in which a temperature sensor is provided in the apparatus to detect a temperature of a user and detection information of the temperature sensor is inputted to the microcomputer.

In addition, in the embodiment above, an example is explained that the acceleration sensor is independently provided. For example, this configuration may be done in which detection information of a gyro provided in the imaging apparatus for camera shake detection and correction is inputted to the microcomputer. In recent years, in the imaging apparatus having a hard disk, some types of the apparatus have a HD acceleration sensor which is applied to detect a drop of the apparatus in order to prevent the head of the hard disk being damaged. Alternatively, this configuration may be done in which detection information of the HD acceleration sensor is used.

As described above, an embodiment of the invention has been described in detail with reference to a specific embodiment. However, it is apparent for a person skilled in the art that modifications and substitutions may be made within the scope of an embodiment of the invention not deviating from the teachings. More specifically, an embodiment of the invention is disclosed in the form of exemplification, which should not be understood in a limited way. The appended claims should be considered in order to interpret the teachings of an embodiment of the invention.

In addition, the sequence of the process steps described in the specification can be executed by hardware, software or the combination thereof. When the sequence of process steps is executed by software, a program having the process sequence recorded is installed in a memory inside a computer incorporated in a specific hardware for implementation, or the program is installed in a general purpose computer which can execute various process steps.

For example, the program can be recorded beforehand in a hard disk or a ROM (Read Only Memory) as a recording medium. Alternatively, the program can be stored (recorded) in a removable medium such as a flexible disc, a CD-ROM (Compact Disc Read Only Memory), an MO (Magneto optical) disc, a DVD (Digital Versatile Disc), a magnetic disc, and a semiconductor memory temporarily or permanently. Such removal recording media can be offered by a so-called package software.

In addition, in addition to installation of the program in the computer from a removable recording medium, the program may be installed in such a way that it is transferred from a download site to a computer in a wireless manner, or that it is transferred to a computer through a network such as a LAN (Local Area Network) or the Internet in a wired manner, and the computer receives the program thus transferred to install it in a recording medium such as a hard disk incorporated therein.

In addition, various process steps described in the specification may be done in time series in described order as well as done in parallel or separately in accordance with the performance of the apparatus for processing or as necessary. In addition, in the specification, the system represents a logical assembly configured of a plurality of devices, which is not limited to that having devices with individual configurations in the same cabinet.

As described above, according to the configuration of an embodiment of the invention, for example, it is configured in the information processing apparatus such as a digital camera in which two states are provided when the power source is turned off: the standby state that places priority to power saving, and the hot standby state that places priority to the starting time, and it is determined whether the apparatus is being carried by a user to execute the transition between these two states. Therefore, a reduction in the starting time and power saving of a battery can be compatible.

For example, when a user is carrying the information processing apparatus (camera), physical fluctuations generated in the apparatus such as an acceleration greater than a defined value is detected to set the state to the hot standby state that places priority to the starting time to allow immediate shooting, whereby the shutter chance can be get immediately almost all the time. On the other hand, when a user does not carry the camera, based on the timeout time period measured by the timer, the state is set to the standby state that places priority to power saving. With this configuration, power consumption can be suppressed, and the battery duration time can be extended as long as possible.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a state detecting part which detects physical fluctuations that are generated in association with a user carrying the information processing apparatus;
   a storage part;
   a timer;
   a manipulating part for receiving a user input;
   a display part; and
   a control part which receives detection information from the state detecting part, and which shifts a standby state to a hot standby state in which a system startup process necessary prior to data processing in the information processing apparatus is completed based on determination that the information processing apparatus is being carried by the user, wherein, in the standby state, power from a power source to all components of the information processing apparatus is stopped except for the state detecting part, the control part, the timer and the manipulating part;

wherein, in the hot standby state, the power from the power source to all components of the information processing apparatus is stopped except for the state detecting part, the control part, the timer, the manipulating part and the storage part; and wherein the control part, when performing the system startup process, generates information necessary to conduct the data processing and stores the necessary information in the storage part.

2. The information processing apparatus according to clam 1, wherein the control part is configured to release the hot standby state of the information processing apparatus and to execute a transition process that shifts a state to the standby state in which the system startup process completed is released, when it determines that the state in which the information processing apparatus is not carried by the user is continued for a predefined time period, based on an input condition for detection information of the state detecting part and an input of time count information from the timer.

3. The information processing apparatus according to clam 1, wherein in the hot standby state, the control part is configured to continue power supply to a storage part and to allow the storage part for self refresh, in order to maintain data recorded in the storage part which is configured of a volatile memory after a system is started up in the information processing apparatus.

4. The information processing apparatus according to clam 1, wherein the state detecting part is an acceleration sensor; and the control part is configured to determine whether the information processing apparatus is being carried by the user, based on input information from the acceleration sensor.

5. The information processing apparatus according to clam 4, wherein the acceleration sensor is an acceleration sensor which detects a drop of the information processing apparatus in order to prevent a hard disk provided in the information processing apparatus from being damaged.

6. The information processing apparatus according to clam 1, wherein the state detecting part is a touch sensor, a temperature sensor, or pressure sensor; and the control part is configured to determine whether the information processing apparatus is being carried by the user, based on input information from the touch sensor, the temperature sensor, or pressure sensor.

7. An imaging apparatus comprising:
an imaging device which executes imaging processing;
a state detecting part which detects physical fluctuations that are generated in association with a user carrying the imaging apparatus;
a storage part;
a timer;
a manipulating part for receiving a user input;
a display part; and
a control part which receives detection information from the state detecting part, and which shifts a standby state to a hot standby state in which a system startup process necessary prior to data processing in the imaging apparatus is completed based on determination that the imaging apparatus is being carried by the user, wherein, in the standby state, power from a power source to all components of the imaging apparatus is stopped except for the state detecting part, the control part, the timer and the manipulating part;

wherein, in the hot standby state, the power from the power source to all components of the imaging apparatus is stopped except for the state detecting part, the control part, the timer, the manipulating part and the storage part; and wherein the control part, when performing the system startup process, generates information necessary to conduct the data processing and stores the necessary information in the storage part.

8. The imaging apparatus according to claim 7, wherein the state detecting part is an acceleration sensor; and the control part is configured to determine whether the imaging apparatus is being carried by the user, based on input information from the acceleration sensor.

9. The imaging apparatus according to claim 8, wherein the acceleration sensor is a gyro which is a camera shake detecting device provided in the imaging apparatus.

10. An information processing method in an information processing apparatus having a state detecting part, a control part, a timer, a manipulating part for receiving a user input, a storage part, and a display part, the method comprising the steps of:

detecting, via the state detecting part, physical fluctuations that are generated in association with a user carrying the information processing apparatus; and controlling, via the control part, for receiving detection information at the state detecting step, and shifting a standby state to a hot standby state in which a system startup process necessary prior to data processing in the information processing apparatus is completed based on determination that the information processing apparatus is being carried by the user, wherein, in the standby state, power from a power source to all components of the information processing apparatus is stopped except for the state detecting part, the control part, timer and the manipulating part;

wherein, in the hot standby state, the power from the power source to all components of the information processing apparatus is stopped except for the state detecting part, the control part, the timer, the manipulating part and the storage part; and wherein the control part, when performing the system startup process, generates information necessary to conduct the data processing and stores the necessary information in the storage part.

11. The information processing method according to claim 10, further comprising the step of:

releasing the hot standby state of the information processing apparatus and executing a transition process that shifts a state to the standby state in which the system startup process completed is released, when it is determined that the state in which the information processing apparatus is not carried by the user is continued for a predefined time period, based on an input condition for detection information at the state detecting step and an input of time count information from the timer.

12. The information processing method according to claim 10, further comprising the step of:

in the hot standby state, continuing power supply to a storage part and allowing the storage part for self refresh, in order to maintain data recorded in the storage part which is configured of a volatile memory after a system is started up in the information processing apparatus.

13. The information processing method according to claim 10, wherein the state detecting step is the step of detecting an acceleration by an acceleration sensor; and the controlling step is to determine whether the information processing apparatus is being carried by the user, based on input information from the acceleration sensor.

14. The information processing method according to claim 10, wherein the state detecting step is the step of detecting a state by a touch sensor, a temperature sensor, or pressure sensor; and the controlling step is to determine whether the information processing apparatus is being carried by the user, based on input information from the touch sensor, the temperature sensor, or pressure sensor.

15. A recording medium, comprising a computer program which allows an information processing apparatus to control a state, the information processing apparatus having a state detecting part, a control part, a timer, a manipulating part for receiving a user input, a storage part, and a display part, the computer program comprising the steps of:

detecting, via the state detecting part, physical fluctuations that are generated in association with a user carrying the information processing apparatus; and controlling, via the control part, for receiving detection information at the state detecting step, and shifting a standby state to a hot standby state in which a system startup process necessary prior to data processing in the information processing apparatus is completed based on determination that the information processing apparatus is being carried by the user, wherein, in the standby state, power from a power source to all components of the information processing apparatus is stopped except for the state detecting part, the control part, timer and the manipulating part;

wherein, in the hot standby state, the power from the power source to all components of the information processing apparatus is stopped except for the state detecting part, the control part, the timer, the manipulating part and the storage part; and wherein the control part, when performing the system startup process, generates information necessary to conduct the data processing and stores the necessary information in the storage part.

\* \* \* \* \*